(12) United States Patent
Krenz et al.

(10) Patent No.: US 7,974,773 B1
(45) Date of Patent: Jul. 5, 2011

(54) METHODS AND DEVICES OF AN AIRCRAFT TAXI NAVIGATION SYSTEM

(75) Inventors: Michael J. Krenz, Cedar Rapids, IA (US); Pamela K. Hahn, Cedar Rapids, IA (US); Bryan C. Schultz, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1048 days.

(21) Appl. No.: 11/820,950

(22) Filed: Jun. 21, 2007

(51) Int. Cl.
*G06F 19/00* (2011.01)
*G06G 7/70* (2006.01)
*G06G 7/76* (2006.01)
*G08B 21/00* (2006.01)
*B64F 1/20* (2006.01)
*G08G 5/00* (2006.01)
*G01C 21/00* (2006.01)
*G01C 23/00* (2006.01)

(52) U.S. Cl. ........ 701/120; 340/945; 340/951; 340/971; 340/980

(58) Field of Classification Search .................. 701/120; 340/945, 947, 951, 958, 971, 972, 980
See application file for complete search history.

(56) References Cited

U.S. PATENT DOCUMENTS

| 6,731,226 | B2 * | 5/2004 | Walter | 340/972 |
| 6,928,363 | B2 * | 8/2005 | Sankrithi | 701/120 |
| 7,196,329 | B1 * | 3/2007 | Wood et al. | 250/330 |
| 7,342,514 | B1 * | 3/2008 | Bailey et al. | 340/961 |
| 7,737,867 | B2 * | 6/2010 | Arthur et al. | 340/980 |
| 7,844,392 | B2 * | 11/2010 | Dubourg | 701/120 |
| 2003/0009278 | A1 * | 1/2003 | Mallet et al. | 701/120 |
| 2003/0105579 | A1 * | 6/2003 | Walter | 701/120 |

* cited by examiner

*Primary Examiner* — John Q Nguyen
*Assistant Examiner* — Nicholas Kiswanto
(74) *Attorney, Agent, or Firm* — Matthew J. Evans; Daniel M. Barbieri

(57) ABSTRACT

A system for providing taxi navigation information to a pilot of an aircraft is comprised of a navigation system; a taxi navigation module consisting of, in part, a processor and database; and an indicating system consisting of, in part, a tactical display unit system (e.g., a primary flight director ("PFD"), and head-up display ("HUD") of an aircraft. A navigation system may provide aircraft position data of the aircraft while it is on the ground. A processor receives the aircraft position data, retrieves taxi navigation symbology based upon the aircraft position data from a taxi navigation database, and provides this data to the indicating system. The indicating system generates the display of taxi navigation information on a display unit which, in turn, provides the pilot with an egocentric view of airport signage using colored aviation signage symbology.

20 Claims, 5 Drawing Sheets

METHODS AND DEVICES OF AN AIRCRAFT TAXI NAVIGATION SYSTEM

BACKGROUND OF THE INVENTION

1. Field of the Invention

This invention pertains to the field of aircraft taxi navigation systems that provide information to pilot or flight crew of the aircraft. The embodiments herein improve taxi navigation systems through the use of a processor that receives the aircraft position data, retrieves taxi navigation symbology based upon the aircraft position data from a taxi navigation database, and displays taxi navigation information of airport ground surfaces in an egocentric view.

2. Description of the Related Art

Runway incursions are the most noticeable form of taxi navigation errors. Increased scrutiny by regulatory authorities has only heightened the awareness of the safety issues related to runway incursions. Taxi navigation errors cause many runway incursions and present potential collision hazards.

A root cause of many of all of taxi navigation errors is the loss of situational awareness during taxi operations. Taxi diagrams have helped correct the problem associated with the loss of situational awareness. However, taxi diagrams require the pilot to look down and read a taxi chart while operating the aircraft that is under power. This is analogous to looking down into one's car to read details from a roadmap or GPS navigation screen while driving. Accordingly, the embodiments herein provide a solution to taxi navigation errors by the development of a novel system, devices, and methods to alleviate the difficulties of reading a taxi map while taxiing.

In the embodiments herein, indications are presented in an egocentric manner or a "pilot's eye" view and not a "bird's eye" view such as reading a roadmap. There are several novel aspects to the embodiments herein including the use of ICAO taxiway and runway signage symbols depicted in an egocentric format on the primary cockpit indicator, the placement of symbologies of runway signage to indicate upcoming left and right turns and current airport surface, the use of distance indications adjacent to the symbologies, and display of a plurality of turns to the left and to the right.

BRIEF SUMMARY OF THE INVENTION

A novel system for providing taxi navigation information to a pilot of an aircraft is provided herein. Novel devices for providing taxi navigation information to the indicating system of an aircraft and taxi information to the pilot or flight crew of an aircraft are provided herein. Novel methods for providing taxi navigation information to the indicating system of an aircraft and taxi navigation information to the pilot or flight crew of an aircraft are provided herein.

In an embodiment, a system for providing taxi navigation information to a pilot of an aircraft is comprised of a navigation system; a taxi navigation module consisting of, in part, a processor and database; and an indicating system consisting of, in part, a tactical display unit system (e.g., a primary flight director ("PFD"), and head-up display ("HUD") of an aircraft. A navigation system may provide aircraft position location of the aircraft while it is on the ground. A processor receives the aircraft position data, retrieves taxi navigation symbology based upon the aircraft position data from a taxi navigation database, and displays taxi navigation information of airport ground surfaces in an egocentric view.

In another embodiment, an egocentric view of airport surface signage symbology is displayed on the display unit. In another embodiment, the signage symbologies are depicted in colors that correspond to the colors of aviations standards for airport signage. In another embodiment, the egocentric view of airport surface symbology on the display unit may be depicted against the backdrop of a blue/brown artificial horizon or synthetic vision image.

DETAILED DESCRIPTION OF THE INVENTION

Figure 1:
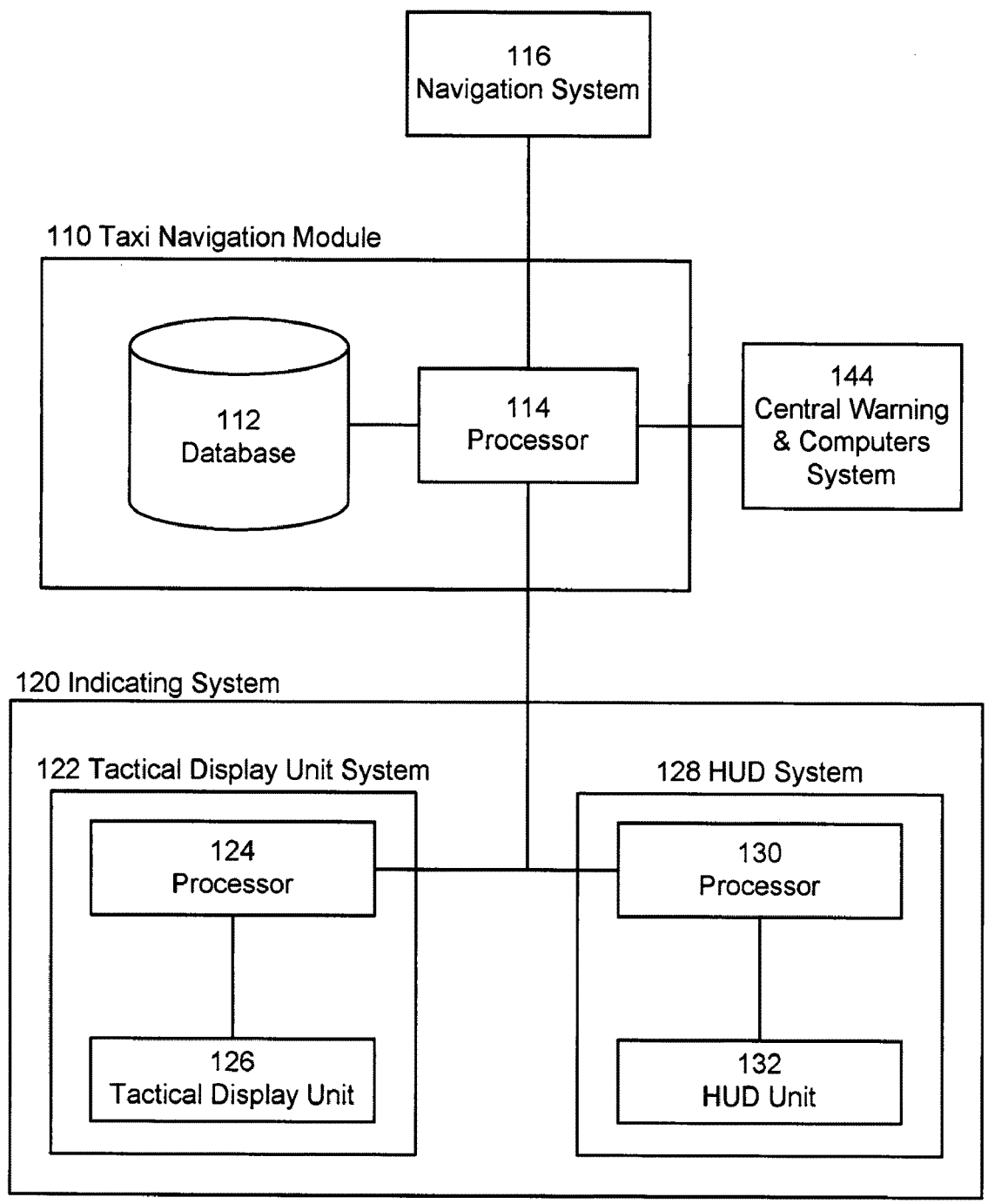
FIG. 1 depicts a block diagram of a taxi navigation system.

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention FIG. 1 depicts a taxi navigation system 100 suitable for implementation of the techniques described herein. The taxi navigation module 110 could be an avionics system of an aircraft which receives and provides electronic data to other avionics systems. In an embodiment of FIG. 1, the taxi navigation module 110 could receive and provide electronics data to an aircraft's navigation system 116, indicating system 120, and central warning and computers system 144 via communication interfaces.

The taxi navigation module 110 of FIG. 1 includes a taxi navigation database 112 and a processor 114. The taxi navigation database 112 may be used to store taxi navigation data that may be comprised of, in part, airport surfaces and airport visual aids. Airport surfaces include, but are not limited to, locations and information delineating or defining locations of runways, taxiways, and apron areas, FBOs, terminals, and other airport facilities. Airport visual aids include, but are not limited to, airport paving markings, runway markings, taxiway markings, holding position markings, airport signs, mandatory instruction signs, location signs, direction signs, destination signs, information signs, and runway distance remaining signs. The taxi navigation data may be stored in a digital memory storage device or computer-readable media including, but not limited to, RAM, ROM, CD, DVD, hard disk drive, diskette, solid-state memory, PCMCIA or PC Card, secure digital cards, and compact flash cards.

The processor 114 may be an electronic data processing unit. A common example of an electronic data processing unit is a microprocessor; however, for the embodiments herein, the processor is not limited to the microprocessor and its meaning should not be construed narrowly. The processor 114 may be used, in part, to receive aircraft position data provided from the navigation system 116, retrieve taxi navigation data from the taxi navigation database 112 corresponding to the aircraft position data, and provide the indicating system 120 with taxi navigation data for the presentation of information on display units therein. In addition, the processor 114 could also consist of more than one electronic data processing units.

The processor 114 may receive aircraft position data from the navigation system 106 as input. The navigation system 116 includes any system that provides navigation data. For example, a typical navigation system in an aircraft is comprised of numerous sub-systems known to those skilled in the art. Sub-systems which provide aircraft position data could include, but are not limited to, an inertial guidance system, a global navigation satellite system ("GNSS"), and a flight management computing system ("FMCS"). It is noted that the FMCS includes a database containing navigation information data including, in part, data pertaining to air navigation facilities, airspace classifications, and en route, terminal, and approach procedures. The database may also contain airport surface information data including, but not limited to, data pertaining runway surfaces. In an embodiment of FIG. 1, the FMCS database could provide a source of taxi navigation data of the taxi navigation module 110.

The processor 114 may provide taxi navigation data to the indicating system 120. The indicating system 120 includes any system that provides flight and system information on an indicator or display unit. For example, a typical indicating system in an aircraft is comprised of numerous sub-systems known to those skilled in the art. Sub-systems which provide taxi navigation information on a display unit include, but are not limited to, a tactical display unit system 110, a Head-Up Display Unit ("HUD") system 114, and a central warning and computers system 118.

The tactical display unit system 122 includes, in part, a processor 124 and a tactical display unit 126. The tactical display unit 126 presents tactical information to the pilot or flight crew—information relevant to the instant or immediate control of the aircraft, whether the aircraft is in flight or on the ground. The tactical display unit 126 displays the same information found on a primary flight display ("PFD") such as basic "T-information" (i.e., airspeed, attitude, altitude, and heading). Although the tactical display unit provides the same information as that of a PFD, the tactical display unit 126 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit 126 is designed to provide flexible configurations which may be tailored to the desired configuration specified by a buyer or user of the aircraft. In an embodiment of FIG. 1, taxi navigation data is provided to the tactical display unit system 122. In another embodiment, taxi navigation information is presented on the tactical display unit 126.

The HUD system 128 includes a HUD unit 132. The HUD unit 132 provides tactical information to the pilot or flight crew. Similar to the tactical display unit 126, the HUD unit 132 may be tailored to the desired configuration specified by a buyer or user of the aircraft. In an embodiment of FIG. 1, taxi navigation information is presented on the HUD unit 132.

The central warning and computers system 144 provides, in part, audible or visual warnings or status messages including, but not limited to, master warning or flight warning systems, central instrument warning, or caution and warning systems, tone generators, and annunciators to the pilot or flight crew. In an embodiment shown in FIG. 1, the central warning and computers system 144 could provide audible or visual warnings to the pilot or crew member of conditions triggered by the taxi navigation system 100. In another embodiment, the central warning and computers system 144 could provide status messages triggered by the taxi navigation module 110. For example, the taxi navigation system 100 could cause the central warning and computers system 144 to provide audible or visual warning or status message to the pilot or flight crew as the aircraft approaches an intersection. In another example, the central warning and computers system 144 could provide an audible or visual warning or status message if the pilot or flight crew has turned off the taxi navigation module 110 or maintenance personnel have deactivated the system. In another embodiment, the central warning and computers system 144 could provide an audible or visual warning or a status message if a fault is detected by the taxi navigation module 110. It should be noted that the previous examples have been provided for illustrative purposes only and are not provided as a limitation or construed to be limiting.

Figure 2:
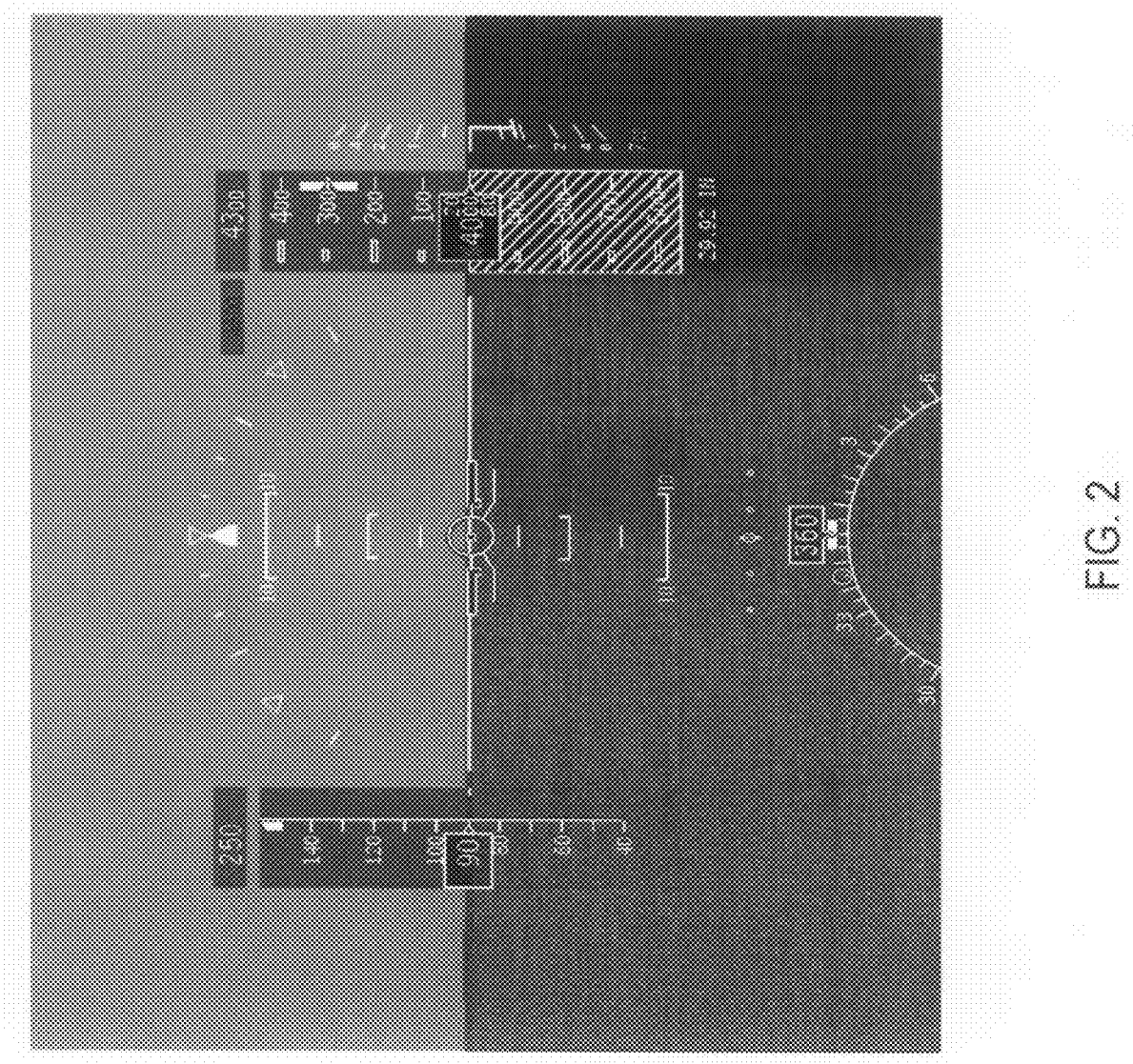
FIG. 2 depicts an exemplary display of a tactical display unit (PFD).

FIG. 2 provides an exemplar depiction of a tactical display unit 126 presenting tactical information to the pilot or flight crew against the backdrop of a blue/brown artificial horizon without the presentation of taxi navigation information. It should be noted that the tactical information depicted on the tactical display unit 126 shown in FIG. 2 is minimal for the sake of presentation and not indicative of the plurality of indications or information with which it may be configured. It should also be noted that tactical information presented on a tactical display unit 126 may also be provided to the pilot or flight crew on a HUD unit 132 in the same configuration. Because the indications or information shown in FIG. 2 are well-known to those skilled in the art, a discussion of the specific tactical information shown in FIG. 2 is not necessary.

Figure 3:
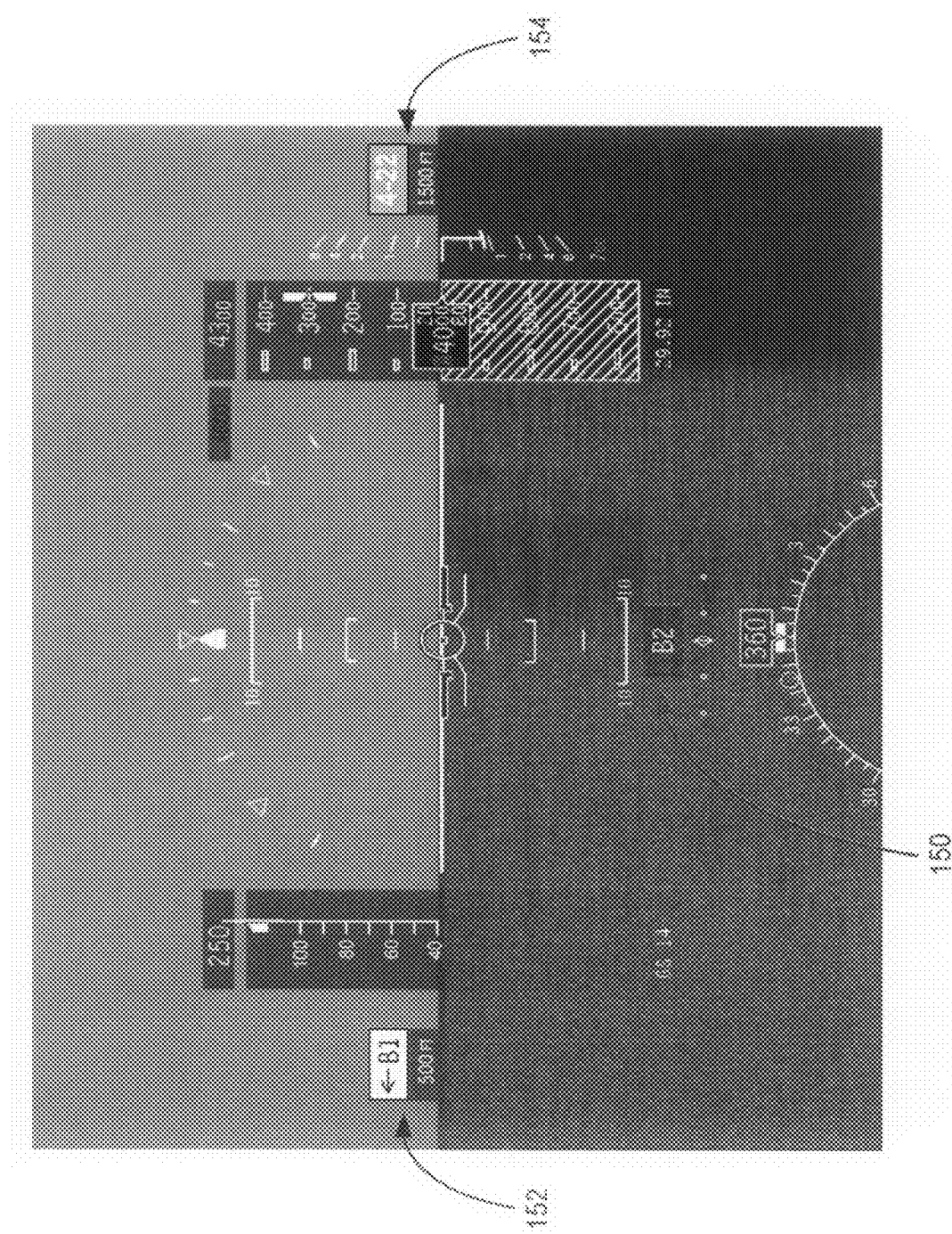
FIG. 3 depicts an exemplary display of a tactical display unit (PFD) of an embodiment herein.

FIG. 3 provides an exemplar depiction of taxi navigation information displayed on a tactical display unit 126. This depiction is presented for the purposes of illustration only and not provided as a limitation. It should be noted that the tactical information depicted on the tactical display unit 126 shown in FIG. 3 is intentionally minimal for the sake of presentation and not indicative of the plurality of indications with which it may be configured; the tactical information displayed in FIG. 3 should not to be construed as a limitation of the embodiments herein.

Item 150 indicates the surface of the airport on which the aircraft is currently located. Here, the indication "B2" informs the pilot or flight crew that the aircraft is located on taxiway B2. Item 152 indicates an airport surface in front of and to the right of the aircraft. Here, the indication "←B1" and "500 feet" informs that pilot or flight crew that the next intersection to the left is intersecting taxiway B1 leading out of the intersection at a distance of 500 feet. Item 154 also indicates an airport surface in front of and to the right of the aircraft. Here, the indication "4-22" and "1500 feet" informs the pilot or flight crew that the next intersection to the right is a holding position on the current taxiway that intersects with runway 4-22 at a distance of 1500 feet. It should be noted that FIG. 3 depicts only one taxi navigation symbol for each item 150, 152, and 154. In another embodiment, a plurality of symbols may be depicted at or near where items 150, 152, and 154 are depicted.

In an embodiment of FIG. 3, taxi navigation information may comprise of, in part, symbologies of airport surfaces, airport surface markings, airport signage, and distances. By providing symbologies, the embodiments herein provide an egocentric or "pilot's eye" view on the display unit 112. Symbologies of airport surfaces include, but are not limited to, runways, taxiways, apron areas, FBOs, terminals, and other airport facilities. Symbologies of airport surface markings include, but are not limited to, airport paving markings, runway markings, taxiway markings, and holding position markings. Symbologies of airport signage include, but not are limited to, airport signs, mandatory instruction signs, location signs, direction signs, destination signs, information signs, and runway distance remaining signs. In another embodiment, the symbologies of airport surfaces, airport surface markings, and airport signage may be depicted in colors which correspond to actual airport surfaces, airport markings, and signage located on an airport. In another embodiment, the size of the symbols depicted on the display unit 112 remain constant; in other words, the symbols do not increase in size as the aircraft approaches an intersection of airport surfaces.

For example, the indication "B2" of item 150 may be displayed with a black background and yellow inscription, symbology corresponding to an actual taxiway surface painted location sign that has a black background with a yellow inscription. In another example, the indication "←B1" of item 152 may be displayed with a yellow background with a black inscription, symbology corresponding to an actual directional sign on which the inscription identifies the designation on an intersecting taxiway leading out of the intersection. In another example, the indication "4-22" of item 154 may be displayed with red background and white inscription, symbology corresponding to an actual runway holding position sign located at the holding position on taxiways that intersect with a runway.

It should be noted that the display unit of FIG. 3 may depict a blue/brown background which is typically for units displaying an artificial horizon and known to those skilled in the art. In another embodiment, the tactical display unit system 110 could generate and display a background with synthetic imagery on the tactical display unit 112. In an embodiment of FIG. 3, taxi navigation information could be displayed on a tactical display unit 112 providing a synthetic imagery background.

Figure 4:
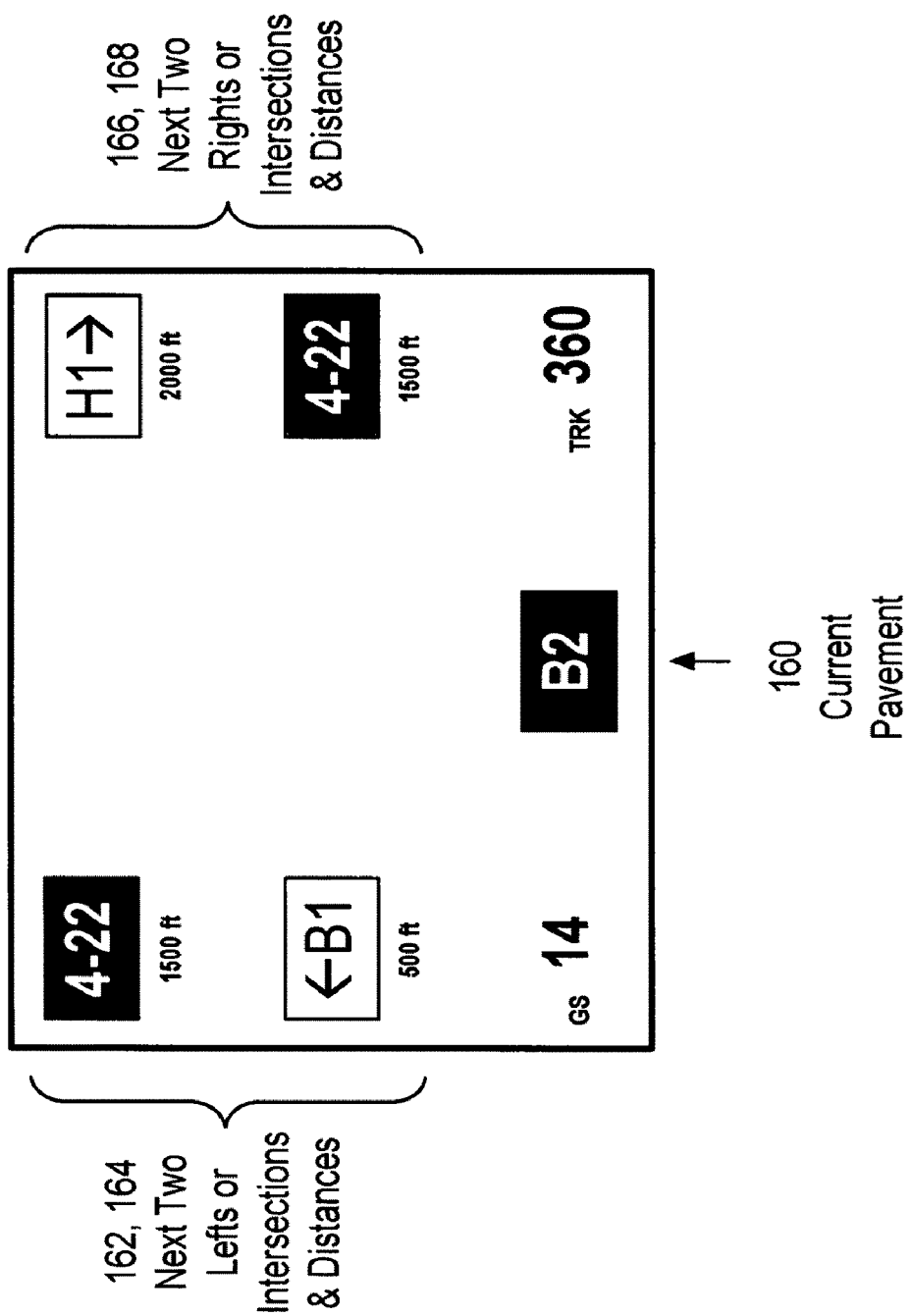
FIG. 4 depicts an exemplary display of a tactical display unit (HUD) of an embodiment herein.

FIG. 4 provides an exemplar depiction of taxi navigation information displayed on a HUD 116. This depiction is presented for the purposes of illustration only and is not provided as a limitation. It should be noted that the tactical information depicted on the HUD 116 shown in FIG. 4 is intentionally minimal for the sake of presentation and is not indicative of the plurality of indications with which it may be configured; the tactical information displayed in FIG. 4 should not to be construed as a limitation of the embodiments herein.

Item 160 indicates the surface of the airport on which the aircraft is currently located. Here, the indication "B2" informs the pilot or flight crew that the aircraft is located on taxiway B2. Items 162 and 164 indicate a plurality of airport surfaces in front of and to the left of aircraft. The indication "←B1" and "500 feet" (item 162) informs that pilot or flight crew that the first intersection to the left is an intersecting taxiway B1 leading out of the intersection at a distance of 500 feet; likewise, the symbology "4-22" and "1500 feet" (item 164) informs the pilot or flight crew that the second intersection to the left is a holding position on the current taxiway that intersects with runway 4-22 at a distance of 1500 feet. Items 166 and 168 indicate a plurality of airport surfaces in front of and to the right of the aircraft. The indication "4-22" and "1500 feet" (item 166) informs the pilot or flight crew that the first intersection to the right is a holding position on the current taxiway that intersects with runway 4-22 at a distance of 1500 feet (which happens to identify the same intersection indicated by the symbology of item 164). Likewise, the indication "H1→" and "2000 feet" (item 168) informs that pilot or flight crew that the second intersection to the right is an intersecting taxiway H1 leading out of the intersection at a distance of 2000 feet.

In an embodiment of FIG. 4, taxi navigation symbology may comprise of, in part, airport surfaces and airport visual aids. This provides an egocentric view, an embodiment of FIG. 4. The same symbologies of airport surfaces and airport visual aids and signs, as discussed above in conjunction with FIG. 3, are equally applicable to the embodiments of FIG. 4. In another embodiment, the taxi navigation symbology of airport surfaces and airport visual aids may be depicted in colors which correspond to the airport surfaces, visual aids, and signs. In another embodiment, the size of the symbols depicted on the display unit 116 remain constant; in other words, the symbols do not increase in size as the aircraft approaches an intersection of airport surfaces.

For example, the indication "B2" of item 160 may be displayed with a black background and yellow inscription, symbology corresponding to an actual taxiway surface painted location sign that has a black background with a yellow inscription. In another example, the indications "←B1" and "H1→" of items 162 and 168 may be each displayed with a yellow background with a black inscription, symbologies which correspond to actual directional signs on which the inscription identifies the designation on an intersecting taxiway leading out of the intersection. In another example, the indications "4-22" of items 164 and 166 may be each displayed with red background and white inscription, symbologies which correspond to an actual runway holding position sign located at the holding position on taxiways that intersect with a runway.

Figure 5:
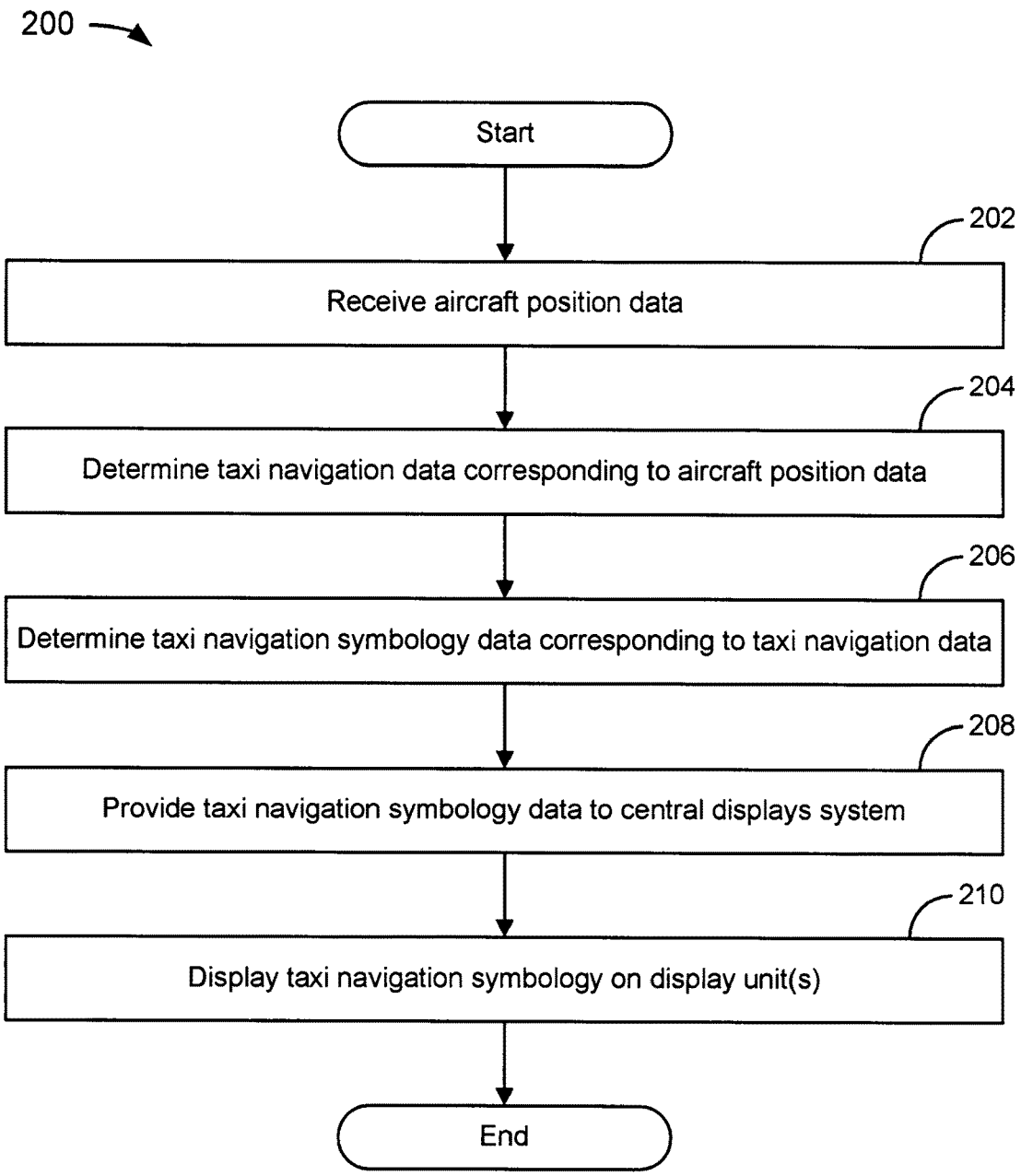
FIG. 5 depicts a flowchart illustrating a method of an embodiment herein.

FIG. 5 depicts flowchart 200 of an example of a method in which taxi navigation information could be displayed within an aircraft. The flowchart begins with module 202 with the taxi navigation system 100 receiving aircraft position data. The flowchart continues to module 204 with the determination of taxi navigation data that corresponds to the aircraft position data. The flowchart continues to module 206 with the retrieval of taxi navigation data from the taxi navigation database 102. The flowchart continues to module 208 with the determination of closest intersection of airport surfaces forward of the aircraft corresponding to the taxi navigation data 102. The flowchart continues to module 210 with the providing of taxi navigation data to the indicating system 108 for egocentric display. The taxi navigation data could be provided to the tactical display unit system 110, the HUD system 128, or both. The flowchart continues to module 212 with the display of egocentric taxi navigation information on the display unit. The taxi navigation data could be displayed on the tactical display unit 112, HUD 116, or both. Then, the flowchart proceeds to the end.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents that fall within the true spirit and scope of the present invention.

What is claimed is:

1. A system for providing taxi navigation information to a pilot of an aircraft, the system comprising:
   an aircraft navigation system for providing aircraft position data;
   a database comprised of taxi navigation data;
   a processor configured to
      receive aircraft position data from the aircraft navigation system,
      retrieve taxi navigation data corresponding to the aircraft position data from the database,
      determine a first surface and at least one intersection of airport surfaces based upon the taxi navigation data, where
         the first surface is the airport surface on which the aircraft is located, and
         each intersection of airport surfaces is located in front of the aircraft and is formed by the intersection of the first surface and a second surface, further where
            a left intersection of airport surfaces is an intersection at which the aircraft may turn left onto a second surface from the first surface, and
            a right intersection of airport surfaces is an intersection at which the aircraft may turn right onto a second surface from the first surface,
      provide taxi navigation symbology data to an aircraft indicating system, where
         the taxi navigation symbology data is representative of at least one airport sign, where each intersection of airport surfaces is denoted by one airport sign comprised of a visible graphical object within which the identifier of the second surface of such intersection is depicted along with a directional symbol if applicable, such that
            one airport sign indicative of the closest left intersection is presented in a left presenting area when at least one left intersection exists, and
            one airport sign indicative of the closest right intersection is presented in a right presenting area when at least one right intersection exists, where
            the left presenting area is found to the left of a first area,
            the right presenting area is found to the right of the first area, and
            a bottom presenting area is found below the first area, below the left presenting area, and below the right presenting area, where such presenting areas are located outside of the first area but inside a second area, where
               the first area is the area within which navigation symbology representative of at least speed, attitude, and altitude is presented,
               the second area is larger than the first area, and
               the second area encompasses the first area; and
   the indicating system configured to receive the taxi navigation symbology data, whereby
      an egocentric view of at least one airport sign is presented on a display unit of the aircraft indicating system, and thus
      airport surface intersection information is presented to the side of the area of navigation symbology.

2. The system of claim 1, wherein the aircraft position data includes data representative of groundspeed and ground track, such that
   the groundspeed is denoted by one airport sign comprised of a visible graphical object within which a numerical value of the groundspeed is depicted, and
   the ground track is denoted by one airport sign comprised of a visible graphical object within which a numerical value of the ground track is depicted, such that
      one airport sign indicative of the groundspeed is presented in the bottom presenting area to the left of the one airport sign indicative of the first surface,
      one airport sign indicative of the ground track is presented in the bottom presenting area to the right of the one airport sign indicative of the first surface, whereby
         groundspeed information and ground track information are presented below the area of navigation symbology in the egocentric view.

3. The system of claim 1, wherein the database comprised of taxi navigation data includes a database of an aircraft's flight management computer system.

4. The system of claim 1, wherein at least one airport sign presented on the display unit remains a constant size.

5. The system of claim 1, wherein
   the processor is further configured to
      provide distance data to the aircraft indicating system, where the distance data is representative of the distance to each intersection of airport surfaces denoted by each airport sign presented on the display unit, such that
         the distance to the closest left intersection is presented in the left presenting area adjacent to the one airport sign indicative of the closest left intersection when at least one left intersection exists, and
         the distance to the closest right intersection is presented in the right presenting area adjacent to the one airport sign indicative of the closest right intersection when at least one right intersection exists, whereby
            distance information is presented to the side of the area of navigation symbology in the egocentric view.

6. The system of claim 1, wherein
   the first surface is denoted by one airport sign comprised of a visible graphical object within which the identifier of the first surface is depicted, such that
      one airport sign indicative of the first surface is presented in the bottom presenting area, whereby
         surface information about the airport surface on which the aircraft is located is presented below the area of navigation symbology in the egocentric view.

7. The system of claim 1, wherein
   the processor is further configured to
      provide distance data to the aircraft indicating system, where the distance data is representative of the distance to each intersection of airport surfaces denoted by each airport sign presented on the display unit, such that
         the distance to the closest left intersection is presented in the left presenting area adjacent to the one airport sign indicative of the closest left intersection when at least one left intersection exists,
         the distance to the closest right intersection is presented in the right presenting area adjacent to the one airport sign indicative of the closest right intersection when at least one right intersection exists,
         one airport sign indicative of the second closest left intersection is presented in a left presenting area when at least two left intersections exist,
         the distance to the second closest left intersection is presented in the left presenting area adjacent to the one airport sign indicative of the second closest left intersection when at least two left intersections exist, one airport sign indicative of the second closest right intersection is presented in a right presenting area when at least two right intersections exist, and the distance to the second closest right intersection is presented in the right presenting area adjacent to the one airport sign indicative of the second closest right intersection when at least two right intersections exist, and the display unit is a HUD, whereby additional airport surface intersection information and distance information is presented to the side of the area of navigation symbology in the egocentric view.

8. The system of claim 1, wherein the egocentric view of at least one airport sign is presented on a display unit of the aircraft indicating system against the backdrop of a synthetic vision image.

9. A device for providing taxi navigation information to a pilot of an aircraft, the device comprising:

an input communications interface to facilitate the receiving of data from an aircraft navigation system and a database comprised of taxi navigation data;

a processor configured to receive aircraft position data from the aircraft navigation system, retrieve taxi navigation data corresponding to the aircraft position data from the database, determine a first surface and at least one intersection of airport surfaces based upon the taxi navigation data, where the first surface is the airport surface on which the aircraft is located, and each intersection of airport surfaces is located in front of the aircraft and is formed by the intersection of the first surface and a second surface, further where a left intersection of airport surfaces is an intersection at which the aircraft may turn left onto a second surface from the first surface, and a right intersection of airport surfaces is an intersection at which the aircraft may turn right onto a second surface from the first surface, provide taxi navigation symbology data to an output communications interface, where the taxi navigation symbology data is representative of at least one airport sign, where each intersection of airport surfaces is denoted by one airport sign comprised of a visible graphical object within which the identifier of the second surface of such intersection is depicted along with a directional symbol if applicable, such that one airport sign indicative of the closest left intersection is presented in a left presenting area when at least one left intersection exists, and one airport sign indicative of the closest right intersection is presented in a right presenting area when at least one right intersection exists, where the left presenting area is found to the left of a first area, the right presenting area is found to the right of the first area, and a bottom presenting area is found below the first area, below the left presenting area, and below the right presenting area, where such presenting areas are located outside of the first area but inside a second area, where the first area is the area within which navigation symbology representative of at least speed, attitude, and altitude is presented, the second area is larger than the first area, and the second area encompasses the first area, whereby an egocentric view of at least one airport sign is presented on a display unit of an aircraft indicating system, and thus airport surface intersection information is presented to the side of the area of navigation symbology; and the output communications interface to facilitate the providing of the taxi navigation symbology data to the aircraft indicating system.

10. The device of claim 9, wherein the aircraft position data includes data representative of groundspeed and ground track, such that the groundspeed is denoted by one airport sign comprised of a visible graphical object within which a numerical value of the groundspeed is depicted, and the ground track is denoted by one airport sign comprised of a visible graphical object within which a numerical value of the ground track is depicted, such that one airport sign indicative of the groundspeed is presented in the bottom presenting area to the left of the one airport sign indicative of the first surface, one airport sign indicative of the ground track is presented in the bottom presenting area to the right of the one airport sign indicative of the first surface, whereby groundspeed information and ground track information are presented below the area of navigation symbology in the egocentric view.

11. The device of claim 9, wherein at least one airport sign presented on the display unit remains a constant size.

12. The device of claim 9, wherein the processor is further configured to provide distance data to the aircraft indicating system, where the distance data is representative of the distance to each intersection of airport surfaces denoted by each airport sign presented on the display unit, such that the distance to the closest left intersection is presented in the left presenting area adjacent to the one airport sign indicative of the closest left intersection when at least one left intersection exists, and the distance to the closest right intersection is presented in the right presenting area adjacent to the one airport sign indicative of the closest right intersection when at least one right intersection exists, whereby distance information is presented to the side of the area of navigation symbology in the egocentric view.

13. The device of claim 9, wherein the first surface is denoted by one airport sign comprised of a visible graphical object within which the identifier of the first surface is depicted, such that one airport sign indicative of the first surface is presented in the bottom presenting area, whereby surface information about the airport surface on which the aircraft is located is presented below the area of navigation symbology in the egocentric view.

14. The device of claim 9, wherein
the processor is further configured to
provide distance data to the aircraft indicating system via the output communications interface, where the distance data is representative of the distance to each intersection of airport surfaces denoted by each airport sign presented on the display unit, such that
the distance to the closest left intersection is presented in the left presenting area adjacent to the one airport sign indicative of the closest left intersection when at least one left intersection exists,
the distance to the closest right intersection is presented in the right presenting area adjacent to the one airport sign indicative of the closest right intersection when at least one right intersection exists,
one airport sign indicative of the second closest left intersection is presented in a left presenting area when at least two left intersections exist,
the distance to the second closest left intersection is presented in the left presenting area adjacent to the one airport sign indicative of the second closest left intersection when at least two left intersections exist,
one airport sign indicative of the second closest right intersection is presented in a right presenting area when at least two right intersections exist, and
the distance to the second closest right intersection is presented in the right presenting area adjacent to the one airport sign indicative of the second closest right intersection when at least two right intersections exist, whereby
additional airport surface intersection information and distance information is presented to the side of the area of navigation symbology in the egocentric view on a HUD.

15. A method for providing taxi navigation information to a pilot of an aircraft, the method comprising:
receiving aircraft position data from an aircraft navigation system;
retrieving taxi navigation data corresponding to the aircraft position data from a taxi navigation database;
determining a first surface and at least one intersection of airport surfaces based upon the taxi navigation data, where
the first surface is the airport surface on which the aircraft is located, and
each intersection of airport surfaces is located in front of the aircraft and is formed by the intersection of the first surface and a second surface, further where
a left intersection of airport surfaces is an intersection at which the aircraft may turn left onto a second surface from the first surface, and
a right intersection of airport surfaces is an intersection at which the aircraft may turn right onto a second surface from the first surface; and
providing taxi navigation symbology data to an aircraft indicating system, where
the taxi navigation symbology data is representative of at least one airport sign, where each intersection of airport surfaces is denoted by one airport sign comprised of a visible graphical object within which the identifier of the second surface of such intersection is depicted along with a directional symbol if applicable, such that
one airport sign indicative of the closest left intersection is presented in a left presenting area when at least one left intersection exists, and
one airport sign indicative of the closest right intersection is presented in a right presenting area when at least one right intersection exists, where
the left presenting area is found to the left of a first area,
the right presenting area is found to the right of the first area, and
a bottom presenting area is found below the first area, below the left presenting area, and below the right presenting area, where such presenting areas are located outside of the first area but inside a second area, where
the first area is the area within which navigation symbology representative of at least speed, attitude, and altitude is presented,
the second area is larger than the first area, and
the second area encompasses the first area, whereby
an egocentric view of at least one airport sign is presented on a display unit of the aircraft indicating system, and thus
airport surface intersection information is presented to the side of the area of navigation symbology.

16. The method of claim 15, wherein
providing distance data to the aircraft indicating system, where the distance data is representative of the distance to each intersection of airport surfaces denoted by each airport sign presented on the display unit, such that
the distance to the closest left intersection is presented in the left presenting area adjacent to the one airport sign indicative of the closest left intersection when at least one left intersection exists, and
the distance to the closest right intersection is presented in the right presenting area adjacent to the one airport sign indicative of the closest right intersection when at least one right intersection exists, whereby
distance information is presented to the side of the area of navigation symbology in the egocentric view.

17. The method of claim 15, wherein the aircraft position data includes data representative of groundspeed and ground track, such that
the groundspeed is denoted by one airport sign comprised of a visible graphical object within which a numerical value of the groundspeed is depicted, and
the ground track is denoted by one airport sign comprised of a visible graphical object within which a numerical value of the ground track is depicted, such that
one airport sign indicative of the groundspeed is presented in the bottom presenting area to the left of the one airport sign indicative of the first surface,
one airport sign indicative of the ground track is presented in the bottom presenting area to the right of the one airport sign indicative of the first surface, whereby
groundspeed information and ground track information are presented below the area of navigation symbology in the egocentric view.

18. The method of claim 15, wherein the taxi navigation database includes a database of an aircraft's flight management computer system.

19. The method of claim 15, further comprising
providing distance data to the aircraft indicating system, where the distance data is representative of the distance to each intersection of airport surfaces denoted by each airport sign presented on the display unit, such that the distance to the closest left intersection is presented in the left presenting area adjacent to the one airport sign indicative of the closest left intersection when at least one left intersection exists, and the distance to the closest right intersection is presented in the right presenting area adjacent to the one airport sign indicative of the closest right intersection when at least one right intersection exists, one airport sign indicative of the second closest left intersection is presented in a left presenting area when at least two left intersections exist, the distance to the second closest left intersection is presented in the left presenting area adjacent to the one airport sign indicative of the second closest left intersection when at least two left intersections exist, one airport sign indicative of the second closest right intersection is presented in a right presenting area when at least two right intersections exist, and the distance to the second closest right intersection is presented in the right presenting area adjacent to the one airport sign indicative of the second closest right intersection when at least two right intersections exist; whereby additional airport surface intersection information and distance information is presented to the side of the area of navigation symbology in the egocentric view on a HUD.

20. The method of claim 15, wherein the first surface is denoted by one airport sign comprised of a visible graphical object within which the identifier of the first surface is depicted, such that one airport sign indicative of the first surface is presented in the bottom presenting area, whereby surface information about the airport surface on which the aircraft is located is presented below the area of navigation symbology in the egocentric view.

\* \* \* \* \*